(12) United States Patent
Li et al.

(10) Patent No.: US 11,288,807 B2
(45) Date of Patent: Mar. 29, 2022

(54) METHOD, ELECTRONIC DEVICE AND STORAGE MEDIUM FOR SEGMENTING IMAGE

(71) Applicant: BEIJING DAJIA INTERNET INFORMATION TECHNOLOGY CO., LTD., Beijing (CN)

(72) Inventors: Xuanping Li, Beijing (CN); Yan Li, Beijing (CN); Chao Zhang, Beijing (CN)

(73) Assignee: Beijing Dajia Internet Information Technology Co., Ltd., Beijing (CN)

( * ) Notice: Subject to any disclaimer, the term of this patent is extended or adjusted under 35 U.S.C. 154(b) by 16 days.

(21) Appl. No.: 16/891,563

(22) Filed: Jun. 3, 2020

(65) Prior Publication Data
US 2020/0294243 A1  Sep. 17, 2020

(30) Foreign Application Priority Data

Jun. 3, 2019  (CN) .......................... 201910478373.2

(51) Int. Cl.
*G06T 7/11* (2017.01)
*G06T 7/73* (2017.01)
(Continued)

(52) U.S. Cl.
CPC ............ *G06T 7/11* (2017.01); *G06K 9/00248* (2013.01); *G06T 7/143* (2017.01); *G06T 7/73* (2017.01);
(Continued)

(58) Field of Classification Search
CPC ............ G06K 9/00248; G06K 9/00281; G06T 2207/20081; G06T 2207/20084;
(Continued)

(56) References Cited

U.S. PATENT DOCUMENTS 10,402,689 B1 *  9/2019  Bogdanovych ......... G06T 11/60
10,757,319 B1 *  8/2020  Luo .................... H04N 5/23216
(Continued)

FOREIGN PATENT DOCUMENTS

CN   102103690 A   6/2011
CN   102436636 A   5/2012
(Continued)

OTHER PUBLICATIONS

Building Security Technology. Jan. 13, 2013, 4 pages, English Abstract Included.

*Primary Examiner* — Bobbak Safaipour
(74) *Attorney, Agent, or Firm* — Meunier Carlin & Curfman LLC

(57) ABSTRACT

The disclosure relates to a method, an electronic device and a storage medium for segmenting an image. The method includes: obtaining an image to be segmented; determining a first face result by detecting a face in the image and a first key-point result by detecting one or more key-points of the face in the image; determining a first face region in the image based on the first face result and the second face result; and segmenting a hair region from the first face region by an image segmentation model, wherein the image segmentation model is trained based on sample images, label mask images and a probability distribution map of hair, and the label mask image comprises a hair region of the sample image, and the probability distribution map of hair comprises a probability distribution of hair in the sample images.

11 Claims, 9 Drawing Sheets

(51) Int. Cl.
  *G06T 7/143* (2017.01)
  *G06K 9/00* (2006.01)
(52) U.S. Cl.
  CPC .............. *G06T 2207/20081* (2013.01); *G06T 2207/30201* (2013.01)
(58) Field of Classification Search
  CPC . G06T 2207/30201; G06T 7/11; G06T 7/143; G06T 7/73
  See application file for complete search history.

(56) References Cited

U.S. PATENT DOCUMENTS

| | | | |
|---|---|---|---|
| 10,948,351 B2* | 3/2021 | Knuebel | G06T 7/90 |
| 2016/0154993 A1* | 6/2016 | Aarabi | H04N 1/4074 |
| | | | 382/118 |
| 2020/0279098 A1* | 9/2020 | Hou | G06K 9/00248 |
| 2021/0219694 A1* | 7/2021 | Zhou | G06T 7/194 |
| 2021/0226873 A1* | 7/2021 | Zhou | H04L 43/0852 |
| 2021/0235845 A1* | 8/2021 | Suwanto | G06K 9/00711 |

FOREIGN PATENT DOCUMENTS

| | | |
|---|---|---|
| CN | 102436637 A | 5/2012 |
| CN | 104246822 A | 12/2014 |
| CN | 105404846 A | 3/2016 |
| CN | 105868769 A | 8/2016 |
| CN | 107220990 A | 9/2017 |
| CN | 108304765 A | 7/2018 |
| WO | 2017181332 A | 10/2017 |

* cited by examiner

METHOD, ELECTRONIC DEVICE AND
STORAGE MEDIUM FOR SEGMENTING
IMAGE

CROSS-REFERENCE TO RELATED APPLICATION

This application is based on and claims priority under 35 U.S.C 119 to Chinese Patent Application No. 201910478373.2, filed on Jun. 3, 2019, in the China National Intellectual Property Administration. The entire disclosure of the above application is incorporated herein by reference.

FIELD OF INVENTION

The disclosure relates to the field of computer vision, and in particular to a method an image and apparatus, an electronic device and a storage medium for segmenting an image.

BACKGROUND

The hair is an important local feature that distinguishes different faces, and plays a vital role in overall image of a person. Based on this, the hair-related applications such as hair segmentation have received increasing attention in recent years, wherein the hair segmentation technology is a technology for automatically segmenting the hair region, which can be applied in scenarios such as hairstyle and hair color change, hair accessory try-on, hairstyle recognition, gender and age estimation, etc.

As is known to all, when segmenting the hair in an image, the hair segmentation effect is better and the application requirement can be satisfied better if it is possible to improve the segmentation precision while ensuring the segmentation efficiency. Therefore, how to segment the image has become a problem which urgently needs to be solved by those skilled in the art.

BRIEF SUMMARY

The disclosure provides a method for segmenting an image and apparatus, an electronic device and a storage medium which can overcome the problem of low efficiency and low precision of segmentation.

According to a first aspect of an embodiment of the disclosure, a method for segmenting an image includes:

obtaining an image to be segmented;

determining a first face result by detecting a face in the image and a first key-point result by detecting one or more key-points of the face in the image;

determining a first face region in the image based on the first face result and the second face result; and segmenting a hair region from the first face region by an image segmentation model, wherein the image segmentation model is trained based on sample images, label mask images and a probability distribution map of hair, and the label mask image includes a hair region of the sample image, and the probability distribution map of hair includes a probability distribution of hair in the sample images.

In the embodiment, the method further includes:

obtaining a training sample set, wherein the training sample set includes a plurality of sample images;

determining a second face result by detecting a face in each of the sample images and a second key-point result by detecting one or more key-points of the face in each of the sample images;

determining a second face region in each of the sample images based on the second face result and the second key-point result;

determining a hair mask region in the label mask image of each of the sample images;

generating the probability distribution map of hair based on the hair mask region corresponding to each of the sample images; and training the image segmentation model based on the probability distribution map of hair, the second face region and the hair mask region.

In the embodiment, the generating the probability distribution map of hair, includes:

generating the probability distribution map of hair by averaging labeled data, wherein the labeled data is data of the corresponding position points of each hair mask region.

In the embodiment, the determining the second face region; and said determining the hair mask region, includes:

determining a clipping size of the second face region and a clipping position of the second face region in the sample image based on the second face result;

determining a rotating angle of the face in a horizontal direction in the sample image based on the second key-point result;

determining the second face region in the sample image based on the clipping size, the clipping position and the rotating angle; and determining the hair mask region in the label mask image.

In the embodiment, the training the image segmentation model, includes:

inputting the second face region and the probability distribution map of hair into a deep learning model for any one of the sample images;

determining whether a predicted result of the deep learning model matches with a labeled result of the hair mask region based on a target loss function;

updating network parameters of the deep learning model iteratively in response to that the predicted result does not match with the labeled result; and determining the image segmentation model in response to that the deep learning model converges.

In the embodiment, the inputting the second face region and the probability distribution map of hair into a deep learning model, includes:

obtaining a new sample image, by combining the second face region and the probability distribution map of hair; and inputting the new sample image into the deep learning model.

In the embodiment, the determining the rotating angle, includes:

determining the rotating angle of the face, in the horizontal direction, in the sample image, based on a left-eye key-point and a right-eye key-point in the second key-point result.

According to a second aspect of an embodiment of the disclosure, an electronic device is provided, which includes:

one or more processors;

one or more memories for storing instructions that can be executed by the one or more processors;

wherein the one or more processors are configured to:

obtain an image to be segmented;

determine a first face result by detecting a face in the image and a first key-point result by detecting one or more key-points of the face in the image;

determine a first face region in the image based on the first face result and the second face result; and segment a hair region from the first face region by an image segmentation model, wherein the image segmentation model is trained based on sample images, label mask images and a probability distribution map of hair, and the label mask image includes a hair region of the sample image, and the probability distribution map of hair includes a probability distribution of hair in the sample images.

In the embodiment, the one or more processors are further configured to:

obtain a training sample set, wherein the training sample set includes a plurality of sample images;

determine a second face result by detecting a face in each of the sample images and a second key-point result by detecting one or more key-points of the face in each of the sample images;

determine a second face region in each of the sample images based on the second face result and the second key-point result;

determine a hair mask region in the label mask image of each of the sample images;

generate the probability distribution map of hair based on the hair mask region corresponding to each of the sample images; and train the image segmentation model based on the probability distribution map of hair, the second face region and the hair mask region.

In the embodiment, the one or more processors are further configured to:

generate the probability distribution map of hair by averaging labeled data, wherein the labeled data is data of the corresponding position points of each hair mask region.

In the embodiment, the one or more processors are further configured to:

determine a clipping size of the second face region and a clipping position of the second face region in the sample image based on the second face result;

determine a rotating angle of the face in a horizontal direction in the sample image based on the second key-point result;

determine the second face region in the sample image based on the clipping size, the clipping position and the rotating angle; and determine the hair mask region in the label mask image.

In the embodiment, the one or more processors are further configured to:

input the second face region and the probability distribution map of hair into a deep learning model for any one of the sample images;

determine whether a predicted result of the deep learning model matches with a labeled result of the hair mask region based on a target loss function;

update network parameters of the deep learning model iteratively in response to that the predicted result does not match with the labeled result; and determine the image segmentation model in response to that the deep learning model converges.

In the embodiment, the one or more processors are further configured to:

obtain a new sample image, by combining the second face region and the probability distribution map of hair; and input the new sample image into the deep learning model.

In the embodiment, the one or more processors are further configured to:

determine the rotating angle of the face, in the horizontal direction, in the sample image, based on a left-eye key-point and a right-eye key-point in the second key-point result.

According to a third aspect of an embodiment of the disclosure, a non-transitory computer-readable storage medium is provided. When the instructions in the storage medium are executed by a processor of an electronic device, the electronic device can perform the method for segmenting an image described in the above first aspect.

According to a fourth aspect of an embodiment of the disclosure, an application program is provided. When the instructions in the application program are executed by a processor of an electronic device, the electronic device can perform the method for segmenting an image described in the above first aspect.

It should be understood that the above general description and the following detailed description are only exemplary and illustrative, and cannot limit the disclosure.

BRIEF DESCRIPTION OF THE DRAWINGS

Accompanying drawings herein are incorporated into and constitute a part of the specification, illustrate the embodiments conforming to the disclosure, and together with the specification, serve to explain the principle of the disclosure.

DETAILED DESCRIPTION OF THE EMBODIMENTS

Figure 1:
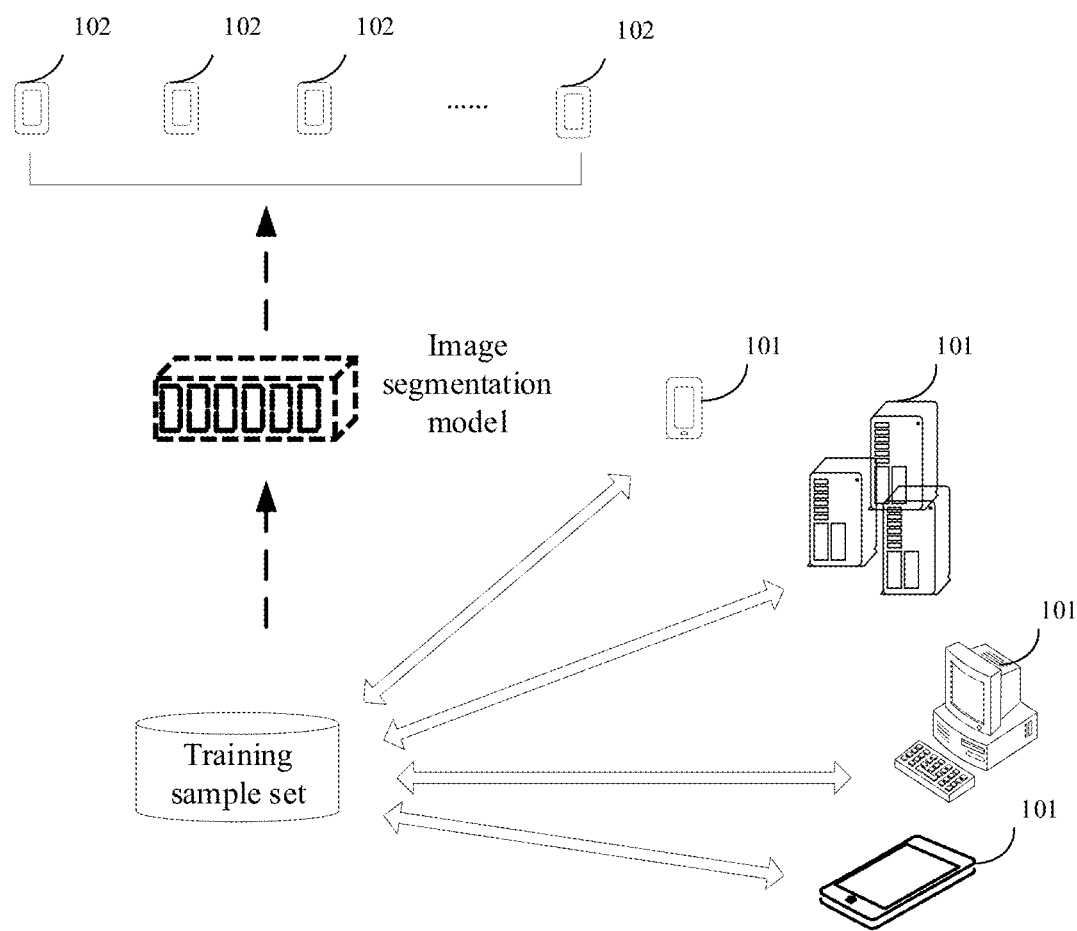
FIG. 1 is a schematic diagram of the implementation environment involved in a method for segmenting an image according to an exemplary embodiment.

In order to enable those ordinary skilled in the art to better understand the technical solutions of the disclosure, the technical solutions in the embodiments of the disclosure will be described clearly and completely with reference to the accompanying drawings.

It should be noted that the terms such as "first", "second" and the like in the specification and claims of the disclosure and the above drawings are used to distinguish the similar objects, but not necessarily to describe a particular order or sequence. It should be understood that the data used in this way is interchangeable under appropriate circumstances, so that the embodiments of the disclosure described herein can be implemented in an order other than those illustrated or described herein. The implementation modes described in the following exemplary embodiments do not represent all the implementation modes consistent with the disclosure. On the contrary, they are only the examples of the devices and methods which are detailed in the attached claims and consistent with some aspects of the disclosure.

Before the embodiments of the disclosure are explained in detail, some terms involved in the embodiments of the disclosure will be explained.

Hair Mask: a binary mask that can indicate whether a given pixel is a part of the hair, for example, when a pixel belongs to the hair, it is identified as 1, otherwise it is identified as 0.

In some embodiments of the disclosure, the hair mask is manually labeled by the labeling personnel in advance. For a face image, a mask image with the same size as the face image will be generated during the labeling stage, wherein this mask image is also referred to as the labeled data or label mask image of the face image herein.

In some embodiments of the disclosure, the region of which the numerical value is 1 in the label mask image is used to indicate the hair region in the face image, and the region of which the numerical value is 0 is used to indicate the non-hair region in the face image.

Deep Learning: the concept thereof stems from the research of artificial neural networks, and the deep learning is a learning method based on the representation of data in the machine learning. To put it another way, the deep learning is a new field in the machine learning research, and its motivation is to establish the neural network of simulating the human brain's analysis and learning.

Face Detection: in the condition that an image is given, all face positions are found out in this image.

A rectangular frame is usually used to frame the face, that is, the input is an image, and the output is a number of rectangular frames containing the faces and the positions of the rectangular frames.

Face Key-point Detection: it is also known as face key positioning or face alignment, and means that the positions of the key region, including eyebrows, eyes, nose, mouth, facial contour and the like, of the face are located in the condition that a face image is given.

Here, a set of key-points is usually called shape, which contains the positional information of the key-points, and this positional information may generally be expressed in two forms, wherein the first type is the positions of the key-points relative to the whole image, and the second type is the positions of the key-points relative to the face rectangular frame, which is not specifically limited in the embodiments of the disclosure.

The implementation environment involved in a method for segmenting an image provided by some embodiments of the disclosure will be introduced and illustrated below.

The method for segmenting an image provided by the embodiment of the disclosure is used for segmenting out the hair region, and this method can be applied in scenarios such as hairstyle color change, hair accessory try-on, hairstyle recognition, gender and age estimation, hair rendering, etc.

Referring to FIG. 1, the implementation environment includes a first electronic device 101 configured to train an image segmentation model, and a second electronic device 102 configured to segment out the hair region by the trained image segmentation model, wherein the first electronic device 101 and the second electronic device 102 may be the same device or may be different devices, which is not specifically limited in the embodiments of the disclosure.

The first electronic device 101 is configured to train the image segmentation model based on a training sample set, and is a computer with the machine learning capability. For example, the first electronic device 101 may be a fixed computer such as personal computer or server, or may be a mobile computer such as tablet computer or smart phone, which is not specifically limited either in the embodiments of the disclosure.

The second electronic device 102 is also a computer with the machine learning capability, and generally refers to a mobile computer such as smart phone or tablet computer.

The methods for segmenting an image provided by the related art are either sensitive to conditions such as lighting, shielding, change in light and dark and the like, resulting in the relatively poor accuracy and robustness of the image segmentation, or use the entire face image as the input of the image segmentation model and thus output the segmentation result with the same size as the input face image. Such methods do not take advantage of the inherent characteristics of the hair and face, for example, the hair must be grown near the face and is unlikely to grow on the foot, resulting in a lot of useless calculations.

Based on this, some embodiments of the disclosure propose a scheme for segmenting an image based on the face alignment clipping and prior probability distribution. This scheme relies on the face detection technology, face key-point detection technology and image segmentation technology, and this scheme can not only achieve the fine segmentation and higher segmentation precision, but also have the better robustness, wherein it is more robust to conditions such as lighting, shielding, change in light and dark and the like.

Figure 2:
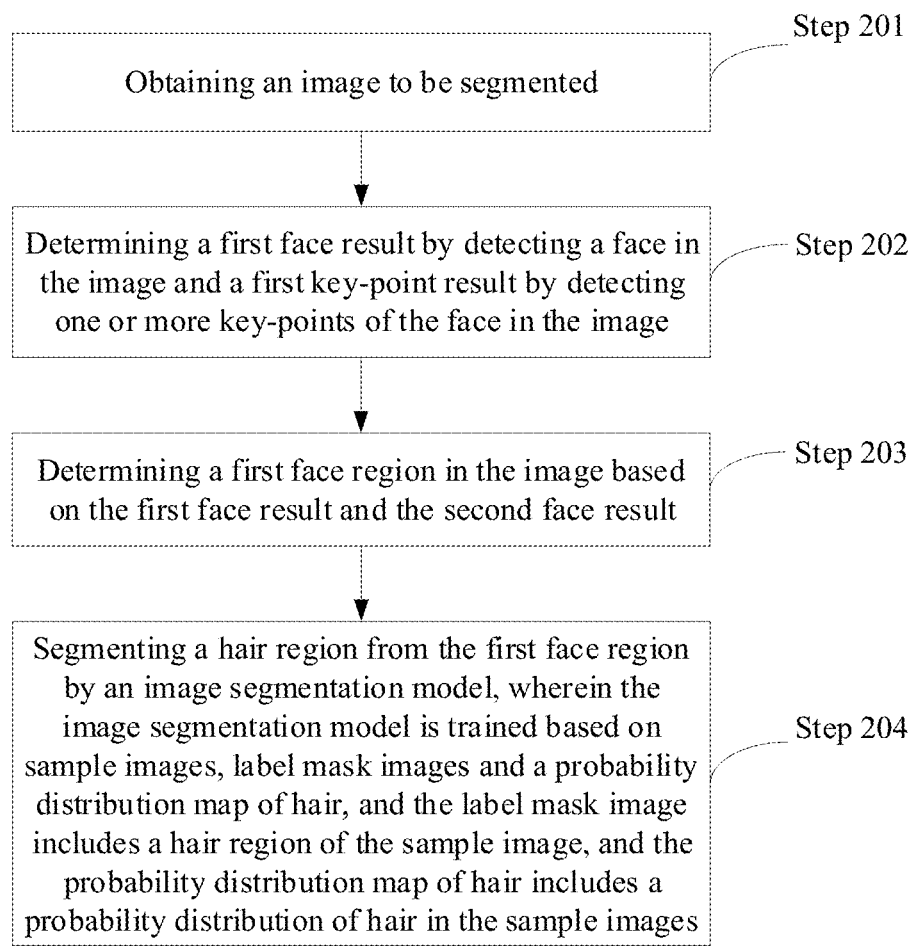
FIG. 2 is a flow chart of a method for segmenting an image according to an exemplary embodiment.

FIG. 2 is a flow chart of a method for segmenting an image according to an exemplary embodiment. As shown in FIG. 2, the method is used in an electronic device and includes the following steps.

Step 201, obtaining an image to be segmented.

Step 202, determining a first face result by detecting a face in the image and a first key-point result by detecting one or more key-points of the face in the image.

Step 203, determining a first face region in the image based on the first face result and the second face result.

Step 204, segmenting a hair region from the first face region by an image segmentation model, wherein the image segmentation model is trained based on sample images, label mask images and a probability distribution map of hair, and the label mask image includes a hair region of the sample image, and the probability distribution map of hair includes a probability distribution of hair in the sample images.

In some embodiments, the method further includes:

obtaining a training sample set, wherein the training sample set includes a plurality of sample images;

determining a second face result by detecting a face in each of the sample images and a second key-point result by detecting one or more key-points of the face in each of the sample images;

determining a second face region in each of the sample images based on the second face result and the second key-point result;

determining a hair mask region in the label mask image of each of the sample images;

generating the probability distribution map of hair based on the hair mask region corresponding to each of the sample images; and training the image segmentation model based on the probability distribution map of hair, the second face region and the hair mask region.

In some embodiments, the generating the probability distribution map of hair, includes:

generating the probability distribution map of hair by averaging labeled data, wherein the labeled data is data of the corresponding position points of each hair mask region.

In some embodiments, the determining the second face region; and said determining the hair mask region, includes:

determining a clipping size of the second face region and a clipping position of the second face region in the sample image based on the second face result;

determining a rotating angle of the face in a horizontal direction in the sample image based on the second key-point result;

determining the second face region in the sample image based on the clipping size, the clipping position and the rotating angle; and determining the hair mask region in the label mask image.

In some embodiments, the training the image segmentation model, includes:

inputting the second face region and the probability distribution map of hair into a deep learning model for any one of the sample images;

determining whether a predicted result of the deep learning model matches with a labeled result of the hair mask region based on a target loss function;

updating network parameters of the deep learning model iteratively in response to that the predicted result does not match with the labeled result;

determining the image segmentation model in response to that the deep learning model converges.

In some embodiments, the inputting the second face region and the probability distribution map of hair into a deep learning model, includes:

obtaining a new sample image, by combining the second face region and the probability distribution map of hair;

inputting the new sample image into the deep learning model.

In some embodiments, the determining the rotating angle, includes:

determining the rotating angle of the face, in the horizontal direction, in the sample image, based on a left-eye key-point and a right-eye key-point in the second key-point result.

All the optional technical solutions described above may be combined arbitrarily to form the optional embodiments of the disclosure, which will not be repeated here.

The method for segmenting an image provided by the embodiment of the disclosure will be explained in detail below.

Figure 3:
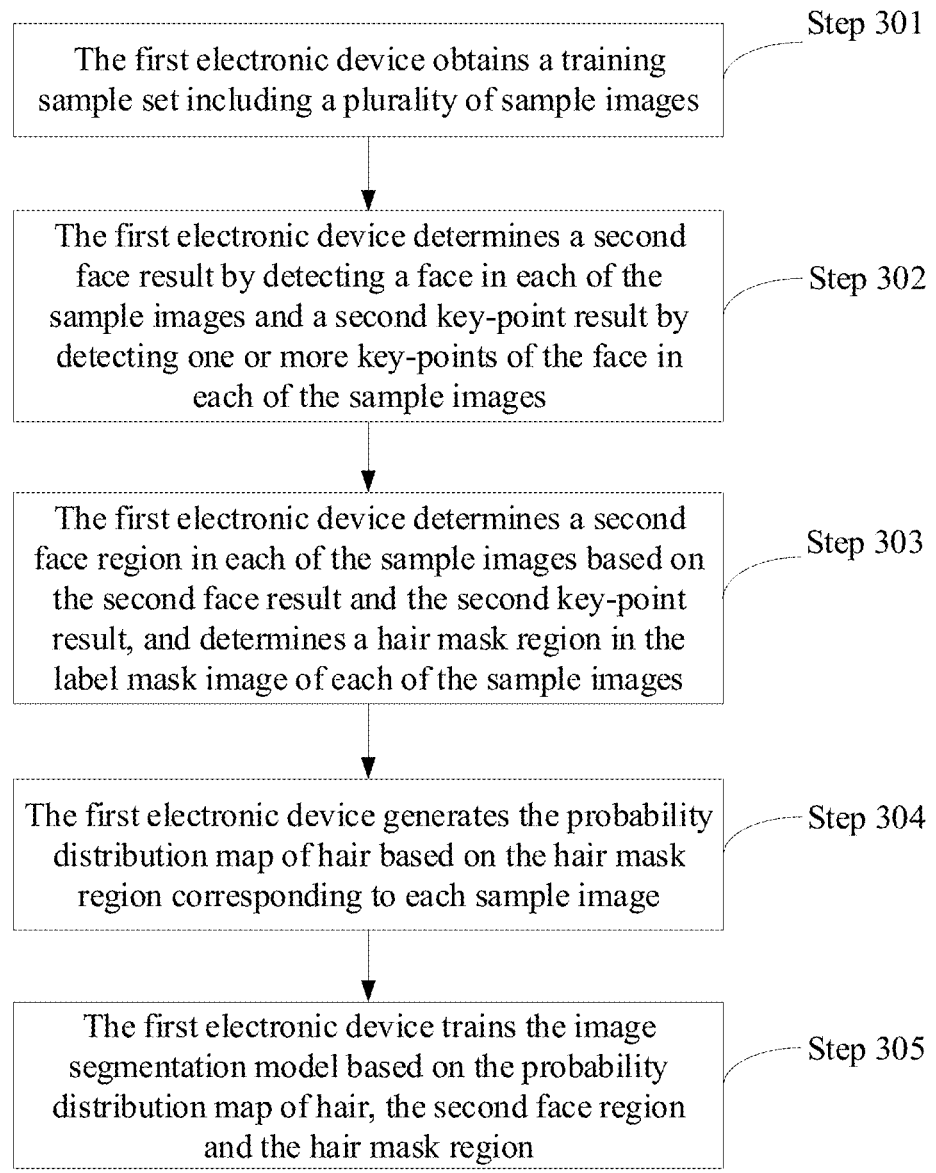
FIG. 3 is a flow chart of another method for segmenting an image according to an exemplary embodiment.

FIG. 3 is a flow chart of a method for segmenting an image according to an exemplary embodiment. As shown in FIG. 3, the method includes the following steps.

Training Stage of Image Segmentation Model

In step 301, the first electronic device obtains a training sample set including a plurality of sample images.

In some embodiments of the disclosure, the sample images included in the training sample set may come from a network public data set, which is not specifically limited in the embodiment of the disclosure. And each sample image includes a face, that is, the sample images included in the training sample set are all the face images.

Furthermore, each sample image corresponds to a piece of labeled data, that is, each sample image is manually labeled with a hair mask in advance to form a label mask image, wherein the label mask image includes the hair region in the corresponding sample image.

In step 302, the first electronic device determines a second face result by detecting a face in each of the sample images and a second key-point result by detecting one or more key-points of the face in each of the sample images.

Figure 4:
FIG. 4 is a schematic diagram of a face detection according to an exemplary embodiment.

For the face detection, as shown in FIG. 4, the face detected in the sample image may be usually labeled with a detecting frame, and the positional information of the detecting frame is given, that is, the position of the detected face in the sample image is given.

In some embodiments, either the deep learning face detection algorithm or the non-deep learning face detection algorithm may be used for the face detection, which is not specifically limited in the embodiments of the disclosure. As an example, the model used for detecting face may be trained for detecting the face based on the pre-labeled training data.

Figure 5:
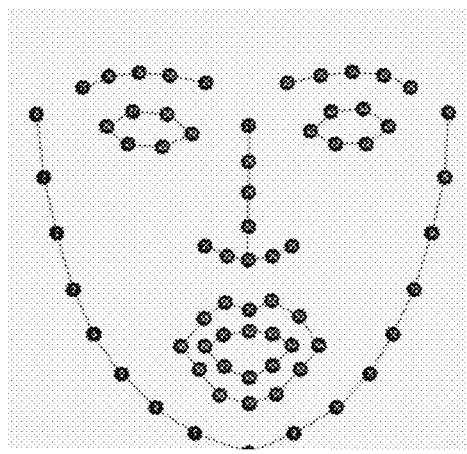
FIG. 5 is a schematic diagram of a face key-point detection according to an exemplary embodiment.

For the face key-point detection, as shown in FIG. 5, the key-points of face include but not limited to: eyebrows, eyes, nose, mouth, and contour of face.

In some embodiments, a network model with the capability for detecting the key points of face is obtained by training the model based on multiple face images and the coordinates of the key-points of face detected in the multiple face images. In the subsequent process, when it is necessary to detect the key-points of face in an image, the image is input into the network model, and the key-points of face in the image are detected by the network model, thereby the coordinates of the key-points of face in the image are determined.

In another possible implementation, the key-points of face may also be detected by:

obtaining multiple face images of the same size, and then generating the average face image, wherein the pixel value of each pixel in the average face image is the average of the pixel values of the corresponding pixels in the multiple face images; then obtaining average values based on the coordinates of the key-points of face in the multiple face images, and determining the average values as the coordinates of the average key-points of face. When detecting one or more key-points of face in an image, a first image is generated, wherein the pixel value of each pixel in the first image is the difference between the pixel value of the corresponding pixel in this image and the pixel value of the corresponding pixel in the average face image; then the coordinate differences between the coordinates of the key-points of face in this image and the coordinates of the average key-points of face are obtained based on the detecting model and the first image; and finally, the coordinates of the key-points of face in this image are determined based on the coordinates of the average key-points of face and the coordinate differences.

In step 303, the first electronic device determines a second face region in each of the sample images based on the second face result and the second key-point result, and determines a hair mask region in the label mask image of each of the sample images.

It should be noted that, in order to facilitate the distinction herein, the face result is also called second face result, the face key-point result is also called second face key-point detection result, and the face region is also called second face region.

In some embodiments of the disclosure, the step 302 includes clipping out the face region in the sample image and clipping out the corresponding hair mask region in the label mask image of the sample image based on the second face result and the second key-point result. The step 302 further includes the following steps.

Step 3031, determining a clipping size of the second face region and a clipping position of the second face region in the sample image based on the second face result.

For this step, the image may be clipped before segmenting out the hair region. The relationship between the hair and the face may be considered during clipping, and then a face region is clipped out with the face as the center, wherein the clipping principle is: to ensure that the clipped-out face region contains hair as much as possible, and also to ensure that the clipped-out face region cannot be too large. The reason is: if the clipped-out face region does not include all the hair, the hair that is not in the clipped region cannot be segmented, while if the clipped region is too large, a lot of useless calculations may be caused, the segmentation efficiency is affected, and it is also difficult to apply to the mobile terminal.

Figure 6:
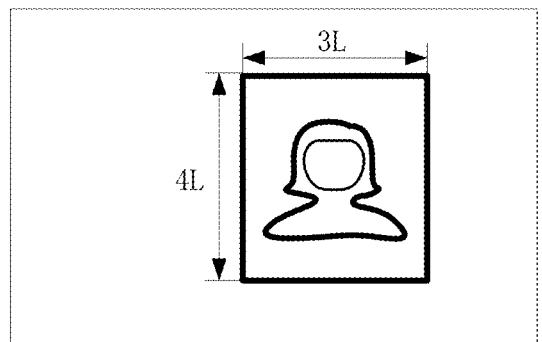
FIG. 6 is a schematic diagram of clipping the face region according to an exemplary embodiment.

Based on the above considerations, and also combined with a lot of experience, In some embodiments, referring to FIG. 6, the clipping size of the face region is: the width of the face region is 3 times the size of the face, and the length is 4 times the size of the face, wherein the face size here refers to the size of the face detecting frame. As an example, the face detecting frame is usually a rectangular frame with equal length and width. By taking the size of the face detecting frame being L*L as an example, the clipping size of the face region may be 4 L*3 L.

In some embodiments, the clipping position may be clipped with the face as the center, wherein the center of the face may be the geometric center point of the face detecting frame, which is not specifically limited in the embodiments of the disclosure.

Step 3032, determining a rotating angle of the face in a horizontal direction in the sample image based on the second key-point result.

For this step, by taking advantage of the symmetry characteristic of the left and right eyes of the face, it may be determined that the sample image includes the rotation angle of the face in the horizontal direction based on the left and right eye key-points.

In some embodiments, it is assumed that the average key-point coordinate of the left eye is (x1, y1) and the average key-point coordinate of the right eye is (x2, y2), then the calculation formula of the rotation angle alpha is: alpha=arctan (−(y2−y1)/(x2−x1)).

Average Key-Point: generally speaking, the eye may have one key-point (pupil position) or may have multiple points. If there is one point, there is no average key-point; if there are multiple key-points, there is a need to calculate the average position, i.e., average key-point, according to the positions of the multiple points.

Step 3033, determining the second face region in the sample image based on the clipping size, the clipping position and the rotating angle; and determining the hair mask region in the label mask image. In some embodiments, clipping out the second face region in the sample image based on the clipping size, the clipping position and the rotation angle, and clipping out the hair mask region in the label mask image.

Since the clipping size, the clipping position and the rotation angle of the face have been determined, the second face region can be clipped out in the sample image, and the mask labeled for segmenting out the hair, i.e., hair mask region, can be clipped out on the label mask image of the sample image.

The first point to be noted is that the size of the face region and the size of the hair mask region are the same, wherein the hair mask region is used to indicate the hair region in the corresponding face region. As an example, a value 1 in the hair mask region indicates that the corresponding pixel in the face region belongs to the hair, and a value 0 in the hair mask region indicates that the corresponding pixel in the face region does not belong to the hair.

The second point to be noted is that the above steps 3031 to 3033 are performed for any sample image included in the training sample set. In other words, a face region may be clipped out in each sample image, and a hair mask region of the same size is clipped out on the corresponding label mask image.

In step 304, the first electronic device generates the probability distribution map of hair based on the hair mask region corresponding to each sample image.

Figure 7:
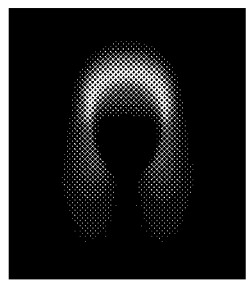
FIG. 7 is a probability distribution diagram of hair according to an exemplary embodiment.

In some embodiments of the disclosure, the probability distribution map of hair may be calculated according to the hair mask regions of all the sample images in the training sample set. Assuming that the training sample set includes 100,000 sample images, the probability distribution map of hair is generated based on the hair mask regions of the 100,000 sample images. Here, FIG. 7 shows a probability distribution map of hair in which the position with the greater brightness has a higher probability of belonging to the hair.

In summary, the probability distribution map of hair is generated based on the hair mask region corresponding to each sample image, including but not limited to: the probability distribution map of hair is generated by adding the labeled data of the corresponding position points in all the hair mask regions and then averaging them.

In some embodiments of the disclosure, all the hair mask region have the same size. As an example, the labeled data includes 0 and 1, wherein 0 represents that the corresponding pixel of the face region is the non-hair region, and 1 represents that the corresponding pixel of the face region is the hair region.

For example, assuming that there are 100,000 sample images, there are 100,000 clipped hair mask regions. For any position point in the 100,000 hair mask regions, it is assumed that there are 10,000 hair mask regions in which the value is 1 at this position point and 90,000 hair mask regions in which the value is 0 at this position point, then the probability of this position point being the hair region is 10%, that is, the probability distribution map of hair provides the probability distribution of the hair in the sample image in the training sample set. This probability distribution is a prior probability distribution, which can indicate the fine segmentation.

In step 305, the first electronic device trains the image segmentation model based on the probability distribution map of hair, the second face region and the hair mask region.

In some embodiments of the disclosure, assuming that there are 100,000 sample images, the numbers of the second face region and the hair mask region are respectively 100,000, and thus the image segmentation model is trained according to the generated probability distribution map of hair, 100,000 face regions and 100,000 hair mask regions. In other words, referring to FIG. 8, the embodiment of the disclosure uses the second face region and the corresponding hair mask as well as the distribution probability map of hair shown in FIG. 7 as the training images and label samples to train the image segmentation model. That is, the input of the model is the second face region and the probability distribution map of hair, and the output of the model is the segmentation result corresponding to the face region.

Figure 8:
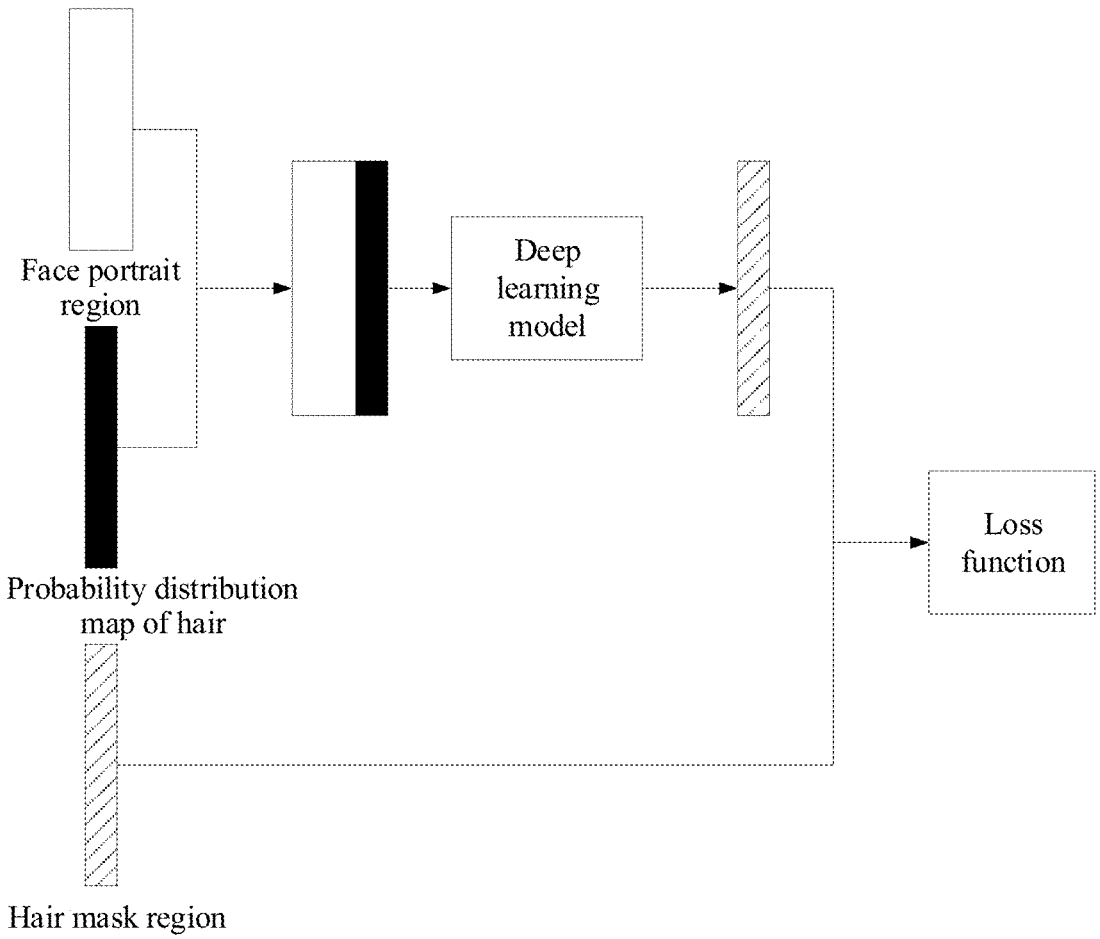
FIG. 8 is a schematic flowchart of training the image segmentation model according to an exemplary embodiment.

As shown in FIG. 8, in some embodiments, the step of training the image segmentation model based on the probability distribution map of hair, the second face region and the hair mask region includes the following steps.

Step 3051, inputting the second face region and the probability distribution map of hair into a deep learning model for any one of the sample images.

For this step, the second face region and the probability distribution map of hair are input into the image segmentation model, including but not limited to: obtaining a new sample image, by combining the second face region and the probability distribution map of hair; and inputting the new sample image into the image segmentation model. In other words, the embodiment of the disclosure combines the face portrait image with the probability distribution map of hair into a new data matrix. It is assumed that the size of the face region is H*W*3 and the size of the probability distribution map of hair is H*W, then the new data matrix is H*W*4. The new data matrix and the corresponding segmentation mask are used as the training data to train the image segmentation model.

Step 3052, determining whether a predicted result of the deep learning model matches with a label result of the hair mask region based on a target loss function; updating network parameters of the deep learning model iteratively in response to that the predicted result does not match with the labeled result; and determining the image segmentation model in response to that the deep learning model converges.

Here, the target loss function may be a cross-entropy loss function, and the deep learning model may be a convolutional neural network, which is not specifically limited in the embodiments of the disclosure. The above predicted result is the segmentation result that is output by the current deep learning model and is consistent with the size of the face region.

Figure 9:
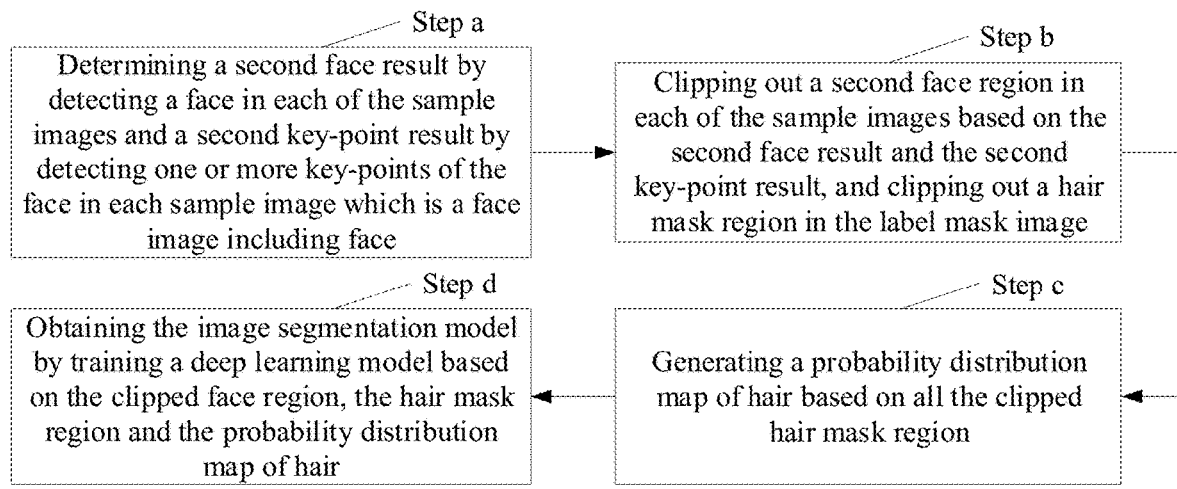
FIG. 9 is an overall flowchart of training the image segmentation model according to an exemplary embodiment.

It should be noted that the training of the image segmentation model is completed through the above steps 301 to 305. Referring to FIG. 9, the overall execution flow of the training process of the image segmentation model includes the following steps.

Step a, determining a second face result by detecting a face in each of the sample images and a second key-point result by detecting one or more key-points of the face in each sample image which is a face image including face.

Step b, clipping out a second face region in each of the sample images based on the second face result and the second key-point result, and clipping out a hair mask region in the label mask image.

In this step, clipping out the second face region by detecting the key point(s) of face, and obtaining the hair mask corresponding to the face portrait by clipping out the corresponding label data.

Step c, generating a probability distribution map of hair based on all the clipped hair mask region.

This step calculates the probability distribution map of hair according to the hair mask of all the labeled data.

Step d, obtaining the image segmentation model by training a deep learning model based on the clipped face region, the hair mask region and the probability distribution map of hair.

Segmenting Stage

Figure 10:
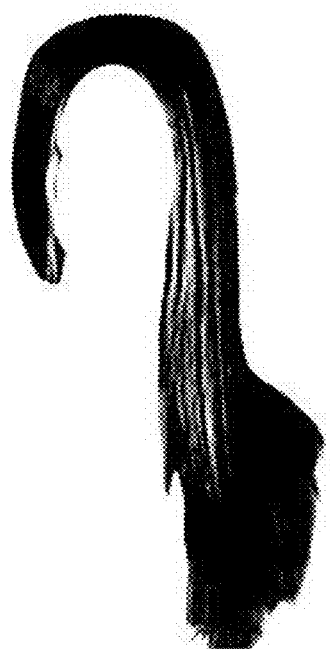
FIG. 10 is a schematic diagram of a hair region according to an exemplary embodiment.
Figure 11:
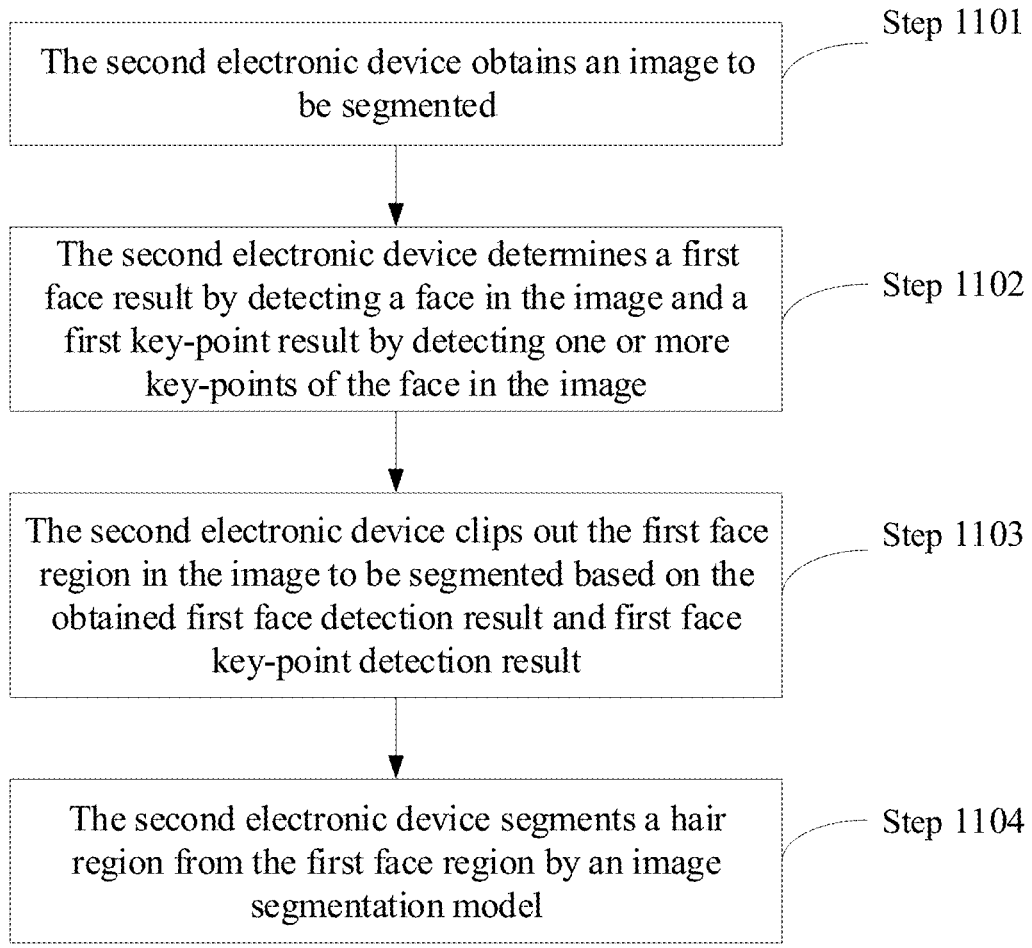
FIG. 11 is a flow chart of another method for segmenting an image according to an exemplary embodiment.

In another embodiment, based on the trained image segmentation model, the segmentation may be performed on any face image. After the segmentation is completed, a hair region such as that shown in FIG. 10 may be obtained. Referring to FIG. 11, the second electronic device performs the segmentation based on the trained image segmentation model, including the following steps.

Step 1101, the second electronic device obtains an image to be segmented.

Step 1102, the second electronic device determines a first face result by detecting a face in the image and a first key-point result by detecting one or more key-points of the face in the image.

For the implementation of this step, the reference may be made to the foregoing step 302, which will not be repeated here.

Step 1103, the second electronic device clips out the first face region in the image to be segmented based on the obtained first face detection result and first face key-point detection result.

For the implementation of this step, the reference may be made to the foregoing step 303, which will not be repeated here.

Step 1104, the second electronic device segments a hair region from the first face region by an image segmentation model.

That is, the first face region is input into the trained image segmentation model, and then the image segmentation model will output the corresponding segmentation result. The hair region may be obtained based on the segmentation result, and after the hair region is obtained, the operations such as hairstyle color change, hair accessory try-on, hairstyle recognition, gender and age estimation, hair rendering, etc. may be performed, which is not specifically limited in the embodiments of the disclosure.

The methods provided by the embodiments of the disclosure have at least the following beneficial effects.

In the model training process, firstly the face detection and the face key-point detection are performed on the sample image; then the face region is clipped out in the sample image and the corresponding hair mask region is clipped out on the label mask image of the sample image based on the detecting result for the face and the detecting result for the key-point(s) of the face; then the probability distribution map of hair is generated based on the hair mask region corresponding to each sample image, and then the image segmentation model is trained based on the probability distribution map of hair, the clipped face region and hair mask region. The sample image and the label mask image are clipped, so a lot of calculations are reduced in the model training process, the model training speed is accelerated, and the model training efficiency is improved. Furthermore, the probability distribution map of hair the probability distribution map of hair includes a probability distribution of the hair in the sample images, and can indicate the fine segmentation. Therefore, the model training based on the probability distribution map of hair can improve the segmentation fineness of the image segmentation model.

In the segmenting stage, firstly the face detection and the face key-point detection are performed on the image to be segmented after obtaining the image to be segmented; then the face region is clipped out in the image to be segmented based on the obtained face detection result and the face key-point detection result; and then the segmentation is performed on the face region based on the trained image segmentation model. The image to be segmented is clipped before it is input to the image segmentation model, and the segmentation is performed based on the clipped face region, thus reducing a lot of useless calculations and improving the segmentation efficiency; and furthermore, the image segmentation model is obtained based on the training of the sample image, label mask image and probability distribution map of hair, wherein the probability distribution map of hair includes the probability distribution of hair in the sample images, and can indicate the fine segmentation. Therefore, the segmentation can be performed finely based on the trained image segmentation model, the segmentation precision can be improved while ensuring the segmentation efficiency, and this segmenting method has a better effect.

Figure 12:
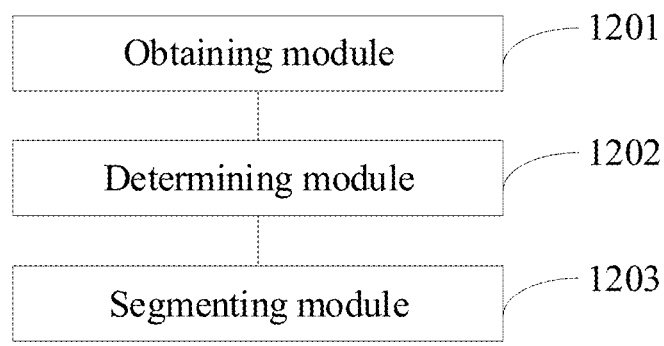
FIG. 12 is a block diagram of an apparatus for segmenting an image according to an exemplary embodiment.

FIG. 12 is a block diagram of an apparatus for segmenting an image according to an exemplary embodiment. Referring to FIG. 12, the apparatus includes an obtaining module 1201, a determining module 1202 and a segmenting module 1203.

The obtaining module 1201 is configured to obtain an image to be segmented.

The determining module 1202 is configured to determine a first face result by detecting a face in the image and a first key-point result by detecting one or more key-points of the face in the image, and determine a first face region in the image based on the first face result and the second face result.

The segmenting module 1203 configured to segment a hair region from the first face region by an image segmentation model, wherein the image segmentation model is trained based on sample images, label mask images and a probability distribution map of hair, and the label mask image includes a hair region of the sample image, and the probability distribution map of hair includes a probability distribution of hair in the sample images.

The apparatus provided by the embodiment of the disclosure firstly performs the face detection and the face key-point detection on the image to be segmented after obtaining the image to be segmented; then clips out the face region in the image to be segmented based on the obtained face detection result and the face key-point detection result; and then performs the segmentation on the face region based on the trained image segmentation model. The image to be segmented is clipped before it is input to the image segmentation model, and the segmentation is performed based on the clipped face region, thus reducing a lot of useless calculations and improving the segmentation efficiency; and furthermore, the image segmentation model is obtained based on the training of the sample image, label mask image and probability distribution map of hair, wherein the probability distribution map of hair includes the probability distribution of hair in the sample images, and can indicate the fine segmentation. Therefore, the segmentation can be performed finely based on the trained image segmentation model, the segmentation precision can be improved while ensuring the segmentation efficiency, and this segmentation method has a better effect.

Figure 13:
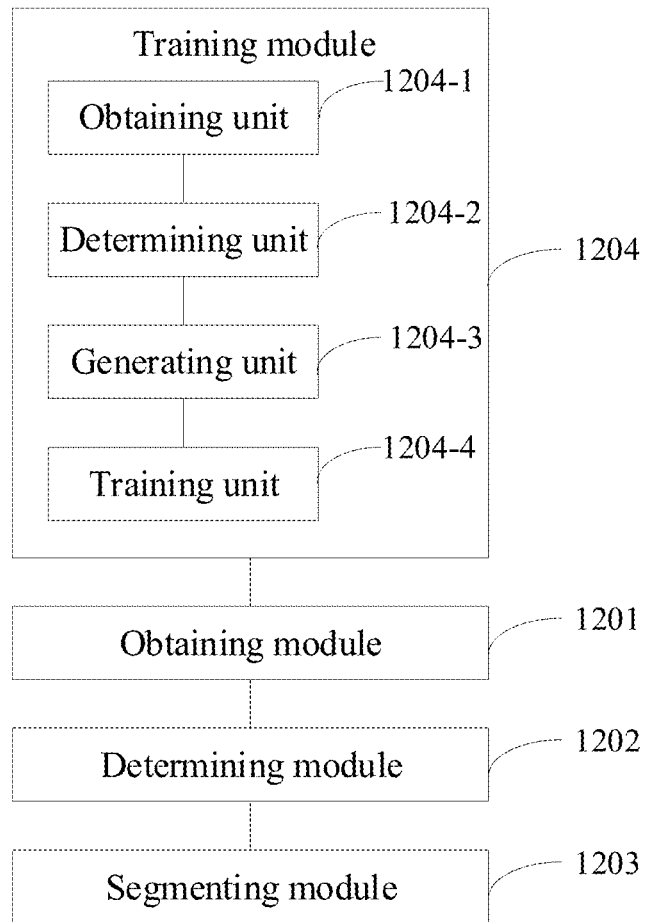
FIG. 13 is a block diagram of another apparatus for segmenting an image according to an exemplary embodiment.

In some embodiments, referring to FIG. 13, the apparatus further includes a training module 1204.

The training module 1204 includes:

an obtaining unit 1204-1 configured to obtain a training sample set, wherein the training sample set includes a plurality of sample images;

a determining unit 1204-2 configured to determine a second face result by detecting a face in each of the sample images and a second key-point result by detecting one or more key-points of the face in each of the sample images, and determine a second face region in each of the sample images based on the second face result and the second key-point result, and determine a hair mask region in the label mask image of each of the sample images; \;

a generating unit 1204-3 configured to generate the probability distribution map of hair based on the hair mask region corresponding to each of the sample images;

a training unit 1204-4 configured to train the image segmentation model based on the probability distribution map of hair, the second face region and the hair mask region.

In some embodiments, the generating unit 1204-3 is further configured to generate the probability distribution map of hair by averaging labeled data, wherein the labeled data is data of the corresponding position points of each hair mask region.

In some embodiments, the determining unit 1204-2 is further configured to determine a clipping size of the second face region and a clipping position of the second face region in the sample image based on the second face result, determine a rotating angle of the face in a horizontal direction in the sample image based on the second key-point result, determine the second face region in the sample image based on the clipping size, the clipping position and the rotating angle, and determine the hair mask region in the label mask image.

In some embodiments, the training unit 1204-4 is further configured, input the second face region and the probability distribution map of hair into a deep learning model for any one of the sample images, determine whether a predicted result of the deep learning model matches with a labeled result of the hair mask region based on a target loss function, update network parameters of the deep learning model iteratively in response to that the predicted result does not match with the labeled result, determine the image segmentation model in response to that the deep learning model converges.

In some embodiments, the training unit 1204-4 is further configured to obtain a new sample image, by combining the second face region and the probability distribution map of hair, and input the new sample image into the deep learning model.

In some embodiments, the determining unit 1204-2 is further configured to determine the rotating angle of the face, in the horizontal direction, in the sample image, based on a left-eye key-point and a right-eye key-point in the second key-point result.

All the optional technical solutions described above may be combined arbitrarily to form the optional embodiments of the disclosure, which will not be repeated here.

Regarding the apparatus in the above embodiment, the specific manner in which each module performs the operations has been described in detail in the embodiment related to the method, and will not be illustrated in detail herein.

Figure 14:
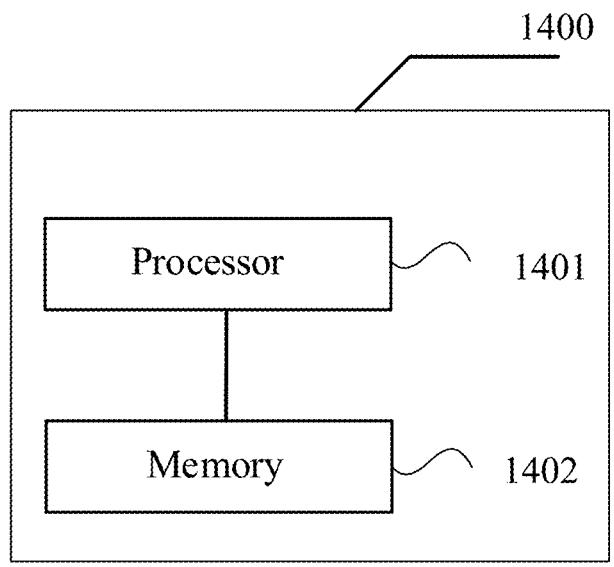
FIG. 14 is a structure block diagram of an electronic device according to an exemplary embodiment.

FIG. 14 is a structure block diagram of an electronic device provided by some embodiments of the disclosure.

The device 1400 may have a relatively large difference due to different configurations or performances, and may include one or more processors (central processing units, CPUs) 1401 and one or more memories 1402, wherein the memory 1402 stores at least one instruction that is loaded and executed by the processor 1401 to implement the method for segmenting an image performed by the first electronic device or the method for segmenting an image performed by the second electronic device provided by the foregoing method embodiments.

Of course, the device may further have components such as a wired or wireless network interface, a keyboard, and input/output interfaces, and the device may further include other components for implementing functions of the device, which will not be repeated here.

In an embodiment, a computer readable storage medium, e.g., a memory including instructions, is further provided, wherein the above instructions may be executed by a processor in a terminal to perform the method for segmenting an image performed by the first electronic device or the method for segmenting an image performed by the second electronic device in the above embodiments. For example, the computer readable storage medium may be read-only memory (ROM), Random Access Memory (RAM), Compact disc read-only memory (CD-ROM), magnetic tape, floppy disk, optical data storage device, or the like.

Figure 15:
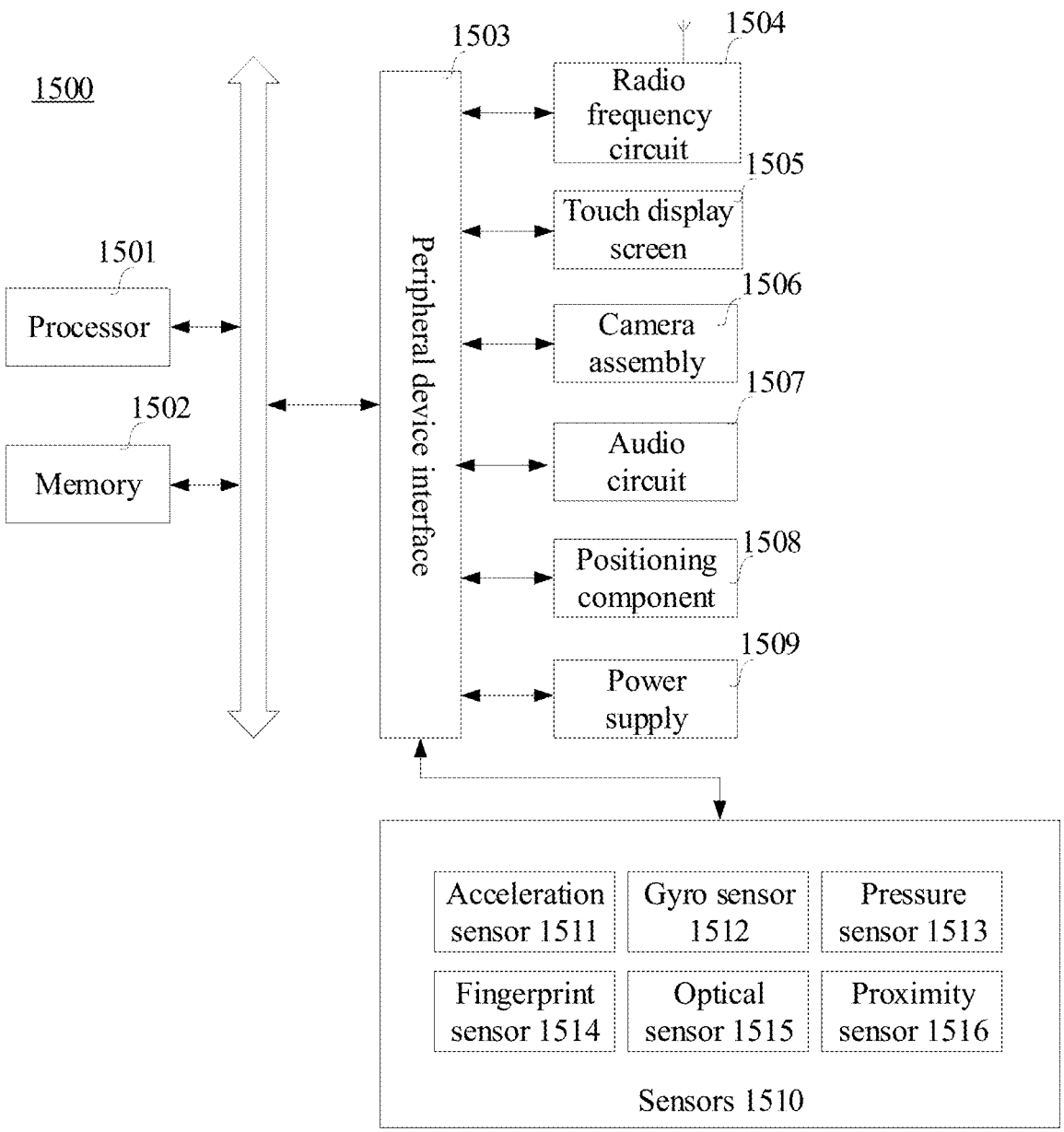
FIG. 15 is a structure block diagram of another electronic device according to an exemplary embodiment.

FIG. 15 shows a structure block diagram of another electronic device provided by an exemplary embodiment of the disclosure.

Generally, the device 1500 includes a processor 1501 and a memory 1502.

The processor 1501 may include one or more processing cores, such as an 4-core processor, an 8-core processor or the like. The processor 1501 may be implemented in at least one hardware form of DSP (Digital Signal Processing), FPGA (Field-Programmable Gate Array) and PLA (Programmable Logic Array). The processor 1501 may also include a main processor and a co-processor, wherein the main processor is a processor for processing the data in the awake state, and also called CPU (Central Processing Unit); and the co-processor is a low-power processor for processing the data in the standby state. In some embodiments, the processor 1501 may be integrated with a GPU (Graphics Processing Unit), which is used to be responsible for rendering and drawing the content that needs to be displayed by the display screen. In some embodiments, the processor 1501 may further include an AI (Artificial Intelligence) processor, which is used to process the computing operations related to the machine learning.

The memory 1502 may include one or more computer readable storage media, which may be non-transitory. The memory 1502 may further include a high-speed random access memory and a non-volatile memory, such as one or more magnetic disk storage devices and flash memory storage devices. In some embodiments, the non-transitory computer readable storage medium in the memory 1502 is used to store at least one instruction which is used to be executed by the processor 1501 to implement the method for segmenting an image performed by the first electronic device or the method for segmenting an image performed by the second electronic device provided by the method embodiments in the disclosure.

In some embodiments, the device 1500 may optionally include a peripheral device interface 1503 and at least one peripheral device. The processor 1501, the memory 1502 and the peripheral device interface 1503 may be connected via buses or signal lines. Each peripheral device may be connected to the peripheral device interface 1503 via a bus, a signal line, or a circuit board. Specifically, the peripheral device includes: at least one of a radio frequency circuit 1504, a touch display screen 1505, a camera 1506, an audio circuit 1507, a positioning component 1508 or a power supply 1509.

The peripheral device interface 1503 may be used to connect at least one I/O (Input/Output)-related peripheral device to the processor 1501 and the memory 1502. In some embodiments, the processor 1501, the memory 1502 and the peripheral device interface 1503 are integrated on the same chip or circuit board; in some other embodiments, any one or two of the processor 1501, the memory 1502 or the peripheral device interface 1503 may be implemented on a separate chip or circuit board, which is not limited in this embodiment.

The radio frequency circuit 1504 is used to receive and transmit the RF (Radio Frequency) signals, also called electromagnetic signals. The radio frequency circuit 1504 communicates with the communication network and other communication devices through electromagnetic signals. The radio frequency circuit 1504 converts electrical signals into electromagnetic signals for transmission, or converts the received electromagnetic signals into electrical signals. Optionally, the radio frequency circuit 1504 includes: an antenna system, an RF transceiver, one or more amplifiers, a tuner, an oscillator, a digital signal processor, a codec chipset, a user identity module card, and the like. The radio frequency circuit 1504 may communicate with other terminals through at least one wireless communication protocol. The wireless communication protocol includes but not limited to: world wide web, metropolitan area network, intranet, various generations of mobile communication networks (2G 3G 4G and 5G), wireless local area network and/or WiFi (Wireless Fidelity) network. In some embodiments, the radio frequency circuit 1504 may further include a circuit related to NFC (Near Field Communication), which is not limited in the disclosure.

The display screen 1505 is used to display a UI (User Interface). The UI may include graphics, text, icon, video and any combination thereof. When the display screen 1505 is a touch display screen, the display screen 1505 further has the ability to gather the touch signals on or above the surface of the display screen 1505. The touch signals may be input to the processor 1501 as control signals for processing. At this time, the display screen 1505 may further be used to provide virtual buttons and/or virtual keyboards, also called soft buttons and/or soft keyboards. In some embodiments, there may be one display screen 1505, which is arranged on the front panel of the device 1500; in other embodiments, there may be at least two display screens 1505, which are arranged on different surfaces of the device 1500 respectively or in a folded design; in still other embodiments, the display screen 1505 may be a flexible display screen, which is arranged on the curved surface or the folded surface of the device 1500. Even, the display screen 1505 can also be set as a non-rectangular irregular figure, i.e., a heteromorphic screen. The display screen 1505 may be manufactured from materials such as LCD (Liquid Crystal Display) and OLED (Organic Light-Emitting Diode).

The camera assembly 1506 is used to collect images or videos. Optionally, the camera assembly 1506 includes a front camera and a rear camera. Generally, the front camera is arranged on the front panel of the terminal, and the rear camera is arrange on the back of the terminal. In some embodiments, there are at least two rear cameras, which are any one of the main camera, the depth-of-field camera, the wide angle camera, or the telephoto camera respectively, so as to realize the fusion of the main camera and the depth-of-field camera to implement the bokeh function, the fusion of the main camera and the wide angle camera to implement the panoramic shooting and VR (Virtual Reality) shooting functions, or other fusion shooting functions. In some embodiments, the camera assembly 1506 may further include a flashlight. The flashlight may be a single color temperature flashlight or a dual color temperature flashlight. The dual color temperature flashlight refers to the combination of a warm light flashlight and a cold light flashlight, and may be used for the light compensation at different color temperatures.

The audio circuit 1507 may include a microphone and a speaker. The microphone is used to collect the sound waves of the user and the environment, and convert the sound waves into electrical signals and input them to the processor 1501 for processing or input them to the radio frequency circuit 1504 to implement the voice communication. For the purpose of stereo collection or noise reduction, there may be multiple microphones, which are respectively arranged on different parts of the device 1500. The microphone may also be an array microphone or an omnidirectional collection microphone. The speaker is used to convert the electrical signals from the processor 1501 or the radio frequency circuit 1504 into sound waves. The speaker may be a traditional thin film speaker or a piezoelectric ceramic speaker. When the speaker is a piezoelectric ceramic speaker, it can not only convert electrical signals into sound waves audible to humans, but also convert electrical signals into sound waves inaudible to humans for ranging and other purposes. In some embodiments, the audio circuit 1507 may further include a headphone jack.

The positioning component 1508 is used to position the current geographic location of the device 1500 to implement the navigation or LBS (Location Based Service). The positioning component 1508 may be a positioning component based on the GPS (Global Positioning System) of United States, the Beidou system of China, or the Galileo system of Russia.

The power supply 1509 is used to supply the power to various components in the device 1500. The power supply 1509 may be alternating current, direct current, disposable battery, or rechargeable battery. When the power supply 1509 includes a rechargeable battery, the rechargeable battery may be a wired rechargeable battery or a wireless rechargeable battery. The wired rechargeable battery is a battery charged through a wired line, and the wireless rechargeable battery is a battery charged through a wireless coil. The rechargeable battery may also be used to support the fast charging technology.

In some embodiments, the device 1500 further includes one or more sensors 1510. The one or more sensors 1510 include but not limited to: an acceleration sensor 1511, a gyro sensor 1512, a pressure sensor 1513, a fingerprint sensor 1514, an optical sensor 1515, and a proximity sensor 1516.

The acceleration sensor 1511 may detect the magnitudes of accelerations on three coordinate axes of the coordinate system established for the device 1500. For example, the acceleration sensor 1511 may be used to detect the components of the gravity acceleration on three coordinate axes. The processor 1501 may control the touch display screen 1505 to display the user interface in a horizontal view or longitudinal view according to the gravity acceleration signal collected by the acceleration sensor 1511. The acceleration sensor 1511 may further be used to collect the movement data of the game or user.

The gyro sensor 1512 may detect the body direction and rotation angle of the device 1500, and the gyro sensor 1512 may cooperate with the acceleration sensor 1511 to collect the 3D actions of the user on the device 1500. According to the data collected by the gyro sensor 1512, the processor 1501 may realize the following functions: motion sensing (such as changing the UI according to the user's tilt operation), image stabilization during shooting, game control, and inertial navigation.

The pressure sensor 1513 may be arranged on the side edge frame of the device 1500 and/or the lower layer of the touch display screen 1505. When the pressure sensor 1513 is arranged on the side edge frame of the device 1500, it may detect the gripping signal of the user on the device 1500, and the processor 1501 performs the left-right hand recognition or shortcut operation according to the gripping signal collected by the pressure sensor 1513. When the pressure sensor 1513 is arranged on the lower layer of the touch display screen 1505, the processor 1501 controls the operable controls on the UI interface according to the pressure operations of the user on the touch display screen 1505. The operable controls include at least one of button control, scroll bar control, icon control, or menu control.

The fingerprint sensor 1514 is used to collect the user's fingerprint, and the processor 1501 identifies the user's identity according to the fingerprint collected by the fingerprint sensor 1514 or the fingerprint sensor 1514 identifies the user's identity according to the collected fingerprint. When the user's identity is identified as a trusted identity, the processor 1501 authorizes the user to perform the related sensitive operations, including unlocking the screen, viewing the encrypted information, downloading softwares, paying, changing settings and the like. The fingerprint sensor 1514 may be arranged on the front, back, or side of the device 1500. When a physical button or a manufacturer's logo is provided on the device 1500, the fingerprint sensor 1514 may be integrated with the physical button or the manufacturer's logo.

The optical sensor 1510 is used to collect the ambient light intensity. In one embodiment, the processor 1501 may control the display brightness of the touch display screen 1505 according to the ambient light intensity collected by the optical sensor 1510. Specifically, when the ambient light intensity is high, the display brightness of the touch display screen 1505 is turned up; when the ambient light intensity is low, the display brightness of the touch display screen 1505 is turned down. In another embodiment, the processor 1501 may further adjust the shooting parameters of the camera assembly 1506 dynamically according to the ambient light intensity collected by the optical sensor 1510.

The proximity sensor 1516, also called distance sensor, is usually arranged on the front panel of the device 1500. The proximity sensor 1516 is used to collect the distance between the user and the front of the device 1500. In one embodiment, when the proximity sensor 1516 detects that the distance between the user and the front of the device 1500 gradually becomes smaller, the processor 1501 controls the touch display screen 1505 to switch from the bright screen state to the breathe screen state; when the proximity sensor 1516 detects that the distance between the user and the front of the device 1500 gradually becomes larger, the processor 1501 controls the touch display screen 1505 to switch from the breathe screen state to the bright screen state.

Those skilled in the art may understand that the structure shown in FIG. 15 does not constitute a limitation on the device 1500, and more or fewer components than those illustrated may be included, or certain components are combined, or different component arrangements are used.

After considering the specification and practicing the invention disclosed here, those skilled in the art will readily come up with other embodiments of the disclosure. The disclosure is intended to encompass any variations, usages or applicability changes of the disclosure, and these variations, usages or applicability changes follow the general principle of the disclosure and include the common knowledge or customary technological means in the technical field which is not disclosed in the disclosure. The specification and embodiments are illustrative only, and the true scope and spirit of the disclosure is pointed out by the following claims.

It should be understood that the disclosure is not limited to the precise structures which have been described above and shown in the figures, and can be modified and changed without departing from the scope of the disclosure. The scope of the disclosure is only limited by the attached claims.

What is claimed is:

1. A method for segmenting an image, comprising:
obtaining an image to be segmented;
determining a first face result by detecting a face in the image and a first key-point result by detecting one or more key-points of the face in the image;
determining a first face region in the image based on the first face result and the first key-point result; and
segmenting a hair region from the first face region by an image segmentation model, wherein the image segmentation model is trained based on sample images, label mask images and a probability distribution map of hair, and the label mask image comprises a hair region of the sample image, and the probability distribution map of hair comprises a probability distribution of hair in the sample images;
where the method further comprises:
obtaining a training sample set, wherein the training sample set comprises a plurality of sample images;
determining a second face result by detecting a face in each of the sample images and a second key-point result by detecting one or more key-points of the face in each of the sample images;
determining a second face region in each of the sample images based on the second face result and the second key-point result;
determining a hair mask region in the label mask image of each of the sample images;
generating the probability distribution map of hair based on the hair mask region corresponding to each of the sample images; and
training the image segmentation model based on the probability distribution map of hair, the second face region and the hair mask region;
wherein said determining the second face region; and said determining the hair mask region, comprises:
determining a clipping size of the second face region and a clipping position of the second face region in the sample image based on the second face result;
determining a rotating angle of the face in a horizontal direction in the sample image based on the second key-point result;
determining the second face region in the sample image based on the clipping size, the clipping position and the rotating angle; and
determining the hair mask region in the label mask image.

2. The method according to claim 1, said generating the probability distribution map of hair, comprises:
generating the probability distribution map of hair by averaging labeled data, wherein the labeled data is data of the corresponding position points of each hair mask region.

3. The method according to claim 1, said training the image segmentation model, comprises:
inputting the second face region and the probability distribution map of hair into a deep learning model for any one of the sample images;
determining whether a predicted result of the deep learning model matches with a labeled result of the hair mask region based on a target loss function;
updating network parameters of the deep learning model iteratively in response to that the predicted result does not match with the labeled result; and
determining the image segmentation model in response to that the deep learning model converges.

4. The method according to claim 3, said inputting the second face region and the probability distribution map of hair into a deep learning model, comprises:
obtaining a new sample image, by combining the second face region and the probability distribution map of hair; and
inputting the new sample image into the deep learning model.

5. The method according to claim 1, said determining the rotating angle, comprises:
determining the rotating angle of the face, in the horizontal direction, in the sample image, based on a left-eye key-point and a right-eye key-point in the second key-point result.

6. An electronic device, comprising:
one or more processors;
one or more memories for storing instructions that can be executed by the one or more processors;
wherein the one or more processors are configured to:
obtain an image to be segmented;
determine a first face result by detecting a face in the image and a first key-point result by detecting one or more key-points of the face in the image;
determine a first face region in the image based on the first face result and the first key-point result; and
segment a hair region from the first face region by an image segmentation model, wherein the image segmentation model is trained based on sample images, label mask images and a probability distribution map of hair, and the label mask image comprises a hair region of the sample image, and the probability distribution map of hair comprises a probability distribution of hair in the sample images;
wherein the one or more processors are further configured to:
obtain a training sample set, wherein the training sample set comprises a plurality of sample images;
determine a second face result by detecting a face in each of the sample images and a second key-point result by detecting one or more key-points of the face in each of the sample images;
determine a second face region in each of the sample images based on the second face result and the second key-point result;
determine a hair mask region in the label mask image of each of the sample images;
generate the probability distribution map of hair based on the hair mask region corresponding to each of the sample images; and
train the image segmentation model based on the probability distribution map of hair, the second face region and the hair mask region;
wherein the one or more processors are further configured to:
determine a clipping size of the second face region and a clipping position of the second face region in the sample image based on the second face result;

determine a rotating angle of the face in a horizontal direction in the sample image based on the second key-point result;
determine the second face region in the sample image based on the clipping size, the clipping position and the rotating angle; and
determine the hair mask region in the label mask image.

7. The electronic device according to claim 6, wherein the one or more processors are further configured to:
generate the probability distribution map of hair by averaging labeled data, wherein the labeled data is data of the corresponding position points of each hair mask region.

8. The electronic device according to claim 6, wherein the one or more processors are further configured to:
input the second face region and the probability distribution map of hair into a deep learning model for any one of the sample images;
determine whether a predicted result of the deep learning model matches with a labeled result of the hair mask region based on a target loss function;
update network parameters of the deep learning model iteratively in response to that the predicted result does not match with the labeled result; and
determine the image segmentation model in response to that the deep learning model converges.

9. The electronic device according to claim 8, wherein the one or more processors are further configured to:
obtain a new sample image, by combining the second face region and the probability distribution map of hair; and
input the new sample image into the deep learning model.

10. The electronic device according to claim 6, wherein the one or more processors are further configured to:
determine the rotating angle of the face, in the horizontal direction, in the sample image, based on a left-eye key-point and a right-eye key-point in the second key-point result.

11. A non-transitory computer readable storage medium, characterized in that, when instructions in the storage medium are executed by a processor of an electronic device, the electronic device can perform the method for segmenting an image of claim 1.

* * * * *